2,867,670

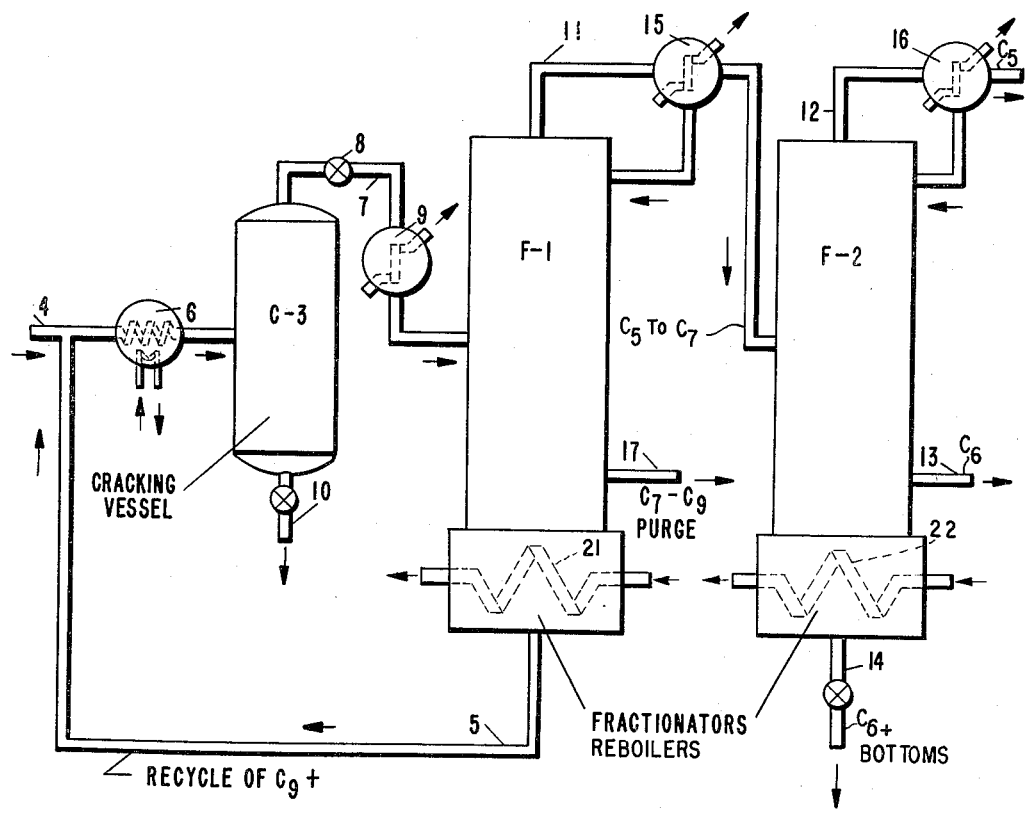

SEPARATION AND PURIFICATION OF CYCLODIENES

Lawrence W. McLean and Leon C. Kenyon, Jr., Baton Rouge, La., assignors to Esso Research and Engineering Company, a corporation of Delaware Application March 2, 1954, Serial No. 413,615

4 Claims. (Cl. 260—666)

This invention relates to separation and purification of cyclopentadiene and methylcyclopentadiene monomers which are mixed in a vapor stream from their cracked crude dimers.

The fractionation of the mixed $C_5$ and $C_6$ cyclodiene monomers contaminated by higher boiling hydrocarbons is complicated by the tendency of these monomers to redimerize and polymerize. The rapid redimerization makes necessary recycling of dimers formed in the distillate to the cracking zone. In the recycling there is a problem of preventing formation of polymers which resist cracking to monomers. There are also other problems of preventing the formation of polymers which tend to cause plugging of the equipment.

In accordance with the present invention, difficulties from dedimerizing and polymerizing to higher molecular weight polymers are advantageously overcome by first fractionating $C_5$ and $C_6$ monomers together from higher boiling components of a cracked dimer product under conditions to provide suitable bottoms for recycling to a cracking zone, and then by further fractionating the $C_5$ and $C_6$ monomers from the first fractionation zone in a second fractionation zone wherein reboiling conditions are maintained to bring about cracking at a rate substantially equivalent to the dimerization rate. By this combination of fractionation steps there is a minimized loss of cyclodienes in purged material unsuitable for recracking. By material unsuitable for recracking is meant a mixture of the $C_5$ and $C_6$ cyclodiene dimers with other codimers and polymers that tend to give rise to substances difficult to recrack and which tend to cause plugging in the equipment.

A preferred mode of operation will be described with reference to the schematic flow diagram in the drawing which illustrates principal equipment used in conjunction with a crude cyclodiene dimer purification unit designed to produce cyclopentadiene and methylcyclopentadiene products, each of above 95% purity.

In the drawing, the first and second fractionating towers, F-1 and F-2, are connected in a series to the cracking unit C-3. The cracking unit may be a liquid-phase, vapor-phase, mixed-phase, or any other type of cracking unit supplying a vapor mixture that contains a substantial amount of $C_5$ and $C_6$ cyclodiene monomer mixed with higher boiling hydrocarbons, principally in the range of $C_7$ to $C_{12}$.

In using an equilibrium liquid-phase cracking zone in cracking unit C-3, a fresh feed stream was charged from line 4. This stream was a $C_5$ and $C_6$ cyclodiene dimer concentrate which should theoretically yield about 30% to 40% cyclopentadiene and 30 to 38% methylcyclopentadiene.

The cracking zone was heated electrically and was operated to give a 1 to 2 hour holdup at about 400° F. to 420° F. at pressures from atmospheric to about 2 atmospheres. The fresh feed stream mixed with a recycle stream from line 5 was preheated to about 320° F. in the heat exchanger 6. Vapor products of the cracking are released through the overhead line 7 to a pressure control valve 8 and through a heat exchanger into a packed column acting as the first fractionating zone F-1. Extruded stainless steel packing was used but other types of packing material or fractionating plates could be used.

The residual refractory liquids formed in the cracking unit C-3 are withdrawn to be purged from the system through line 10. This material represents largely undesirable material in the feed and polymers formed in operation.

The first fractionating zone F-1 is designed to operate under conditions and with sufficient fractionation to take the $C_5$ and $C_6$ monomer vapors overhead through line 11 to the second fractionation zone in column F-2.

The overhead vapor stream from the first fractionating column or tower F-1 may be maintained at a vapor temperature of about 136° F. to 138° F. At these temperatures monomers of $C_5$ cyclodienes, about 57%, and $C_6$ cyclodienes, about 40%, with less than 1.0% $C_7$ cyclodienes are passed on to the second fractionating tower F-2. With this kind of feed to the second tower F-2, the $C_5$ and $C_6$ monomers can be satisfactorily separated and recovered as 95+% purity products with the $C_7$ cyclodienes in the $C_6$ cyclodiene stream as an impurity.

The $C_5$ cyclodiene product is taken as an overhead fraction from F-2 through line 12. The $C_6$ cyclodiene product is withdrawn as a side stream through line 13 or as a bottoms fraction by line 14 from tower F-2. Condensing heat exchangers 15 in overhead line 11, and 16 in overhead line 12 can be used to provide reflux which is returned to the top of each of the towers F-1 and F-2 so as to aid the control of vapor temperatures at the top of each of these towers or columns; for example, a temperature of the order of 135°-140° F. at the top of F-1 and a temperature of the order of 100°-110° F. at the top of F-2. A significant difference in the operation of towers F-1 and F-2 is in the necessity of recycle from the F-1 tower, whereas the F-2 tower can be operated without recycle or purge losses.

In the operation of the first fractionating tower F-1, it is important to make a separation between the heavier components carried over with the $C_5$ and $C_6$ monomers. This separation is advantageously carried out by withdrawing a $C_7$-$C_9$ purge as a side stream between the inlet from line 7 and the bottom of tower F-1. This side stream may amount to about 10% of the fresh feed and is indicated to be withdrawn through line 17. This purge material containing mostly $C_7$-$C_9$ hydrocarbons is preferably prevented from returning to the cracking zone with redimerized material which is to be recycled as bottoms from tower F-1 through line 5. The recycle bottoms stream with the type of operation described should generally amount to about 400 to 500% of the fresh feed rate. It is necessary to recycle this large proportion of material and to subject it to recracking on account of the equilibrium conditions in the cracking zone and on account of the dimerization rate in the first fractionating zone. By using a proper recycle rate excessive polymerization in the cracking zone is avoided.

Operations have demonstrated that the second column F-2 can be controlled to recrack $C_5$ and $C_6$ cyclodiene dimers to give close to 100% recovery of the desired monomer fed to column F-2. Accordingly, recycling from the bottom of the second column F-2 can be entirely eliminated with the advantage that desirable cyclodiene products to not have to be recycled to the cracking zone, where a portion would become part of the purge stream from the cracker.

Reflux and product takeoff systems on both fractionating towers were hand controlled by rotometer sets but any equivalent means may be used for controlling temperatures. The desired monomer products from the second tower, F-2, were batched dimerized for storage.

Although the main features of operation have been emphasized in the description of this point, there are several other control features which are important in the process for obtaining better recovery of desired products. For example, if complete separation of $C_6$ from $C_7$ compounds is attempted in the first fractionator F-1, a significant portion of $C_6$ tends to be lost due to the difficulty of making this separation. Thus, it was found desirable to allow an appreciable small portion of $C_7$ (½ to 1½ weight percent) to remain in the overhead of $C_5$ and $C_6$ monomers from tower F-1 passed to tower F-2.

This small amount of $C_7$ taken overhead will tend to give some contamination to the $C_6$ product withdrawn from tower F-2. However, with proper operating conditions in the towers, the purity of methylcyclopentadiene side stream withdrawn from the second tower F-2 remains above 95%.

It was proved that the problem of excessive polymerization to more refractory materials in the fractionators F-1 and F-2 was well overcome. A system, such as described, was operated for a period of weeks without plugging difficulties. Inspection of the unit showed that the reboilers with heating means 21 and 22 of both towers were in excellent condition with no coke or gummy deposits. The foregoing more particular studies demonstrate the teaching that it is desirable to permit a small amount of the $C_7$ components to pass overhead with the $C_5$ and $C_6$ monomers from the first fractionating zone F-1. These studies also demonstrated that it was desirable to have substantially all the recycle from the bottom of the first tower F-1 for recracking and to preferably maintain a recycle rate of about 400 to 450% with release to the fresh feed supplied to a liquid phase cracking unit. One of the most important factors as previously pointed out in the described operation, is in maintaining a sufficiently high reboiler heat input through heating means 22 to the bottoms of the second tower F-2 so as to recrack the dimer at a rate equivalent to the dimerization in the tower. It was demonstrated that the desired operation was accomplished by reboiler temperatures of the order of 350° to 400° F. under atmospheric conditions and that these reboiler conditions did not adversely interfere with a satisfactory separation of the $C_6$ cyclodiene monomer product having a purity above 95% and containing no more than about 2.5% of $C_7$ impurity. A typical operation is summarized in the following tabulated form.

Feed composition:                                           Percent
   Cyclic $C_5$ ------------------------------------ 36.1
   Cyclic $C_6$ ------------------------------------ 27.1
   Cyclic $C_7$ ------------------------------------ 9.6
   Acyclic $C_5$ ----------------------------------- 7.2
   Aromatics and ethers --------------------- 20.0

Cracker operating conditions:
   400–410° F.
   8–12 p. s. i. g.
   .9–1.2 hours hold up F-1 operating conditions:
   136–138° F. overhead vapor temperature
   320–360° F. reboiler temperature
   450% recycle to cracker
   5/1 reflux ratio
   Atmospheric pressure
   $C_7$–$C_9$ sidestream purge, 10% based on fresh feed F-2 operating conditions:
   105° F. overhead vapor temperature
   160° F. $C_6$ side stream
   350–400° F. reboiler temperature
   No recycle
   5/1 reflux ratio
   Atmospheric pressure
   No purge The described invention is claimed as follows:

1. In separating and purifying $C_5$ and $C_6$ cyclodiene monomers contaminated by $C_7$ to $C_9$ hydrocarbon impurities in a vapor stream, first fractionating said stream to separate the $C_5$ and $C_6$ monomers with about ½ to 1½ weight percent of $C_7$ impurities as an overhead distillate from a first fractionating zone having a reboiling bottoms temperature of 320° to 360° F., then separating the $C_5$ and $C_6$ monomers of said overhead distillate in a second fractionating zone having a bottoms temperature in the range of 350° to 400° F. to crack substantially all dimer formed in said second fractionating zone which is maintained substantially free of $C_7$ to $C_9$ hydrocarbon impurities except for the small amount of $C_7$ impurities present in the overhead distillate from said first fractionating zone.

2. In a process of claim 1, withdrawing a side stream of $C_7$ to $C_9$ impurities from the first fractionating zone.

3. In fractionating a mixture of $C_5$ and $C_6$ cyclodiene monomers contaminated by $C_7$ and higher boiling hydrocarbons, the improvement which comprises first fractionating said mixture to obtain a mixture of the $C_5$ and $C_6$ cyclodiene monomers as a distillate freed of higher boiling hydrocarbons except for $C_7$ hydrocarbons in an amount up to 1–1½ weight percent, passing the resulting distillate fraction of the $C_5$ and $C_6$ cyclodiene monomers thus freed of the higher boiling hydrocarbons to a second fractionating zone, maintaining a high reboiling heat input in the bottoms part of said fractionating zone to crack dimers of the cyclodienes at a rate equivalent to the rate of their formation in said second fractionation zone, and recovering from said second fractionating zone a low boiling overhead distillate of the $C_5$ cyclodiene monomers and a separate fractional distillate of the $C_6$ cyclodiene monomer.

4. In separating and purifying $C_5$ and $C_6$ cyclodiene monomers contaminated by $C_7$ to $C_9$ hydrocarbon impurities in a vapor stream from a cracking zone, first fractionating said stream to separate the $C_5$ and $C_6$ monomers with about 0.5 to 1.5 weight percent $C_7$ impurities in an overhead distillate vapor at a temperature of about 136° F. to 138° F. from a first fractionating zone having a reboiling bottoms temperature of 320° F. to 360° F., a portion of the overhead distillate being refluxed to the upper part of said first fractionating zone for temperature control, withdrawing a side stream purge of $C_7$ to $C_9$ impurities from said first fractionating zone, recycling bottoms of the first fractionating zone to the cracking zone in a proportion of about 400 to 500% of fresh feed thereto to form said vapor stream, and separating the $C_5$ and $C_6$ monomers of the overhead distillate from the first fractionating zone in a second fractionating zone having a bottoms temperature in the range of 350° F. to 400° F. to crack substantially all dimer formed in said second fractionating zone, said second fractionating zone being maintained substantially free of $C_7$ to $C_9$ hydrocarbon impurities except for the small amount of $C_7$ impurities present in the overhead distillate from said first fractionating zone.

References Cited in the file of this patent
UNITED STATES PATENTS

| | | |
|---|---|---|
| 2,387,993 | Hepp | Oct. 30, 1945 |
| 2,636,056 | Jones | Apr. 21, 1953 |
| 2,733,279 | Wilson et al. | Jan. 31, 1956 |
| 2,735,875 | Hubbard et al. | Feb. 21, 1956 |
| 2,751,422 | Nelson et al. | June 19, 1956 |